(12) United States Patent
Wilkerson et al.

(10) Patent No.: US 11,042,403 B2
(45) Date of Patent: Jun. 22, 2021

(54) PLATFORM AUTO-CONFIGURATION AND TUNING

(71) Applicant: INTEL CORPORATION, Santa Clara, CA (US)

(72) Inventors: Christopher B. Wilkerson, Portland, OR (US); Karl I. Taht, Salt Lake City, UT (US); Ren Wang, Portland, OR (US); James J. Greensky, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 15/645,226

(22) Filed: Jul. 10, 2017

(65) Prior Publication Data
US 2019/0012200 A1 Jan. 10, 2019

(51) Int. Cl.
*G06F 9/48* (2006.01)
*G06F 11/36* (2006.01)
*G06F 11/34* (2006.01)

(52) U.S. Cl.
CPC .......... *G06F 9/4881* (2013.01); *G06F 9/485* (2013.01); *G06F 11/3409* (2013.01); *G06F 11/3466* (2013.01); *G06F 11/3612* (2013.01); *G06F 2201/88* (2013.01)

(58) Field of Classification Search
None
See application file for complete search history.

(56) References Cited

U.S. PATENT DOCUMENTS

| | | | | |
|---|---|---|---|---|
| 7,032,217 B2* | 4/2006 | Wu | ...... | G06F 11/3612 |
| | | | | 714/E11.211 |
| 7,962,314 B2* | 6/2011 | Chernoff | ...... | G06F 9/542 |
| | | | | 702/186 |
| 9,223,967 B2* | 12/2015 | Ghose | ...... | G06F 21/51 |

OTHER PUBLICATIONS

Hsu etal., Technical report Phase locality Detection Using a Branch Trace Buffer for Efficient Profiling in Dynamic Optimization, Dept. of Computer Science and Engineering University of Minnesota, 16 pages. (Year: 2002).*
Vijayan ,B., Accurate and Low-Overhead Dynamic Detection and Prediction of Program Phases Using Branch Signatures, IEEE.pp. 3-10. (Year: 2008).*
Nagpurkar, P., Efficient Remote Profiling for Resource-Constrained Devices, ACM, pp. 35-66. (Year: 2006).*

* cited by examiner

*Primary Examiner* — Eric Coleman
(74) *Attorney, Agent, or Firm* — Patent Capital Group

(57) ABSTRACT

A computing platform, including: an execution unit to execute a program, the program including a first phase and a second phase; and a quick response module (QRM) to: receive a program phase signature for the first phase; store the program phase signature in a pattern match action (PMA) table; identify entry of the program into the first phase via the PMA; and apply an optimization to the computing platform.

25 Claims, 8 Drawing Sheets

PLATFORM AUTO-CONFIGURATION AND TUNING

FIELD OF THE SPECIFICATION

This disclosure relates in general to the field of semiconductor devices, and more particularly, though not exclusively, to a system and method for platform auto-configuration and tuning.

BACKGROUND

Multiprocessor systems are becoming more and more common. In the modern world, compute resources play an ever more integrated role with human lives. As computers become increasingly ubiquitous, controlling everything from power grids to large industrial machines to personal computers to light bulbs, the demand for ever more capable processors increases.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
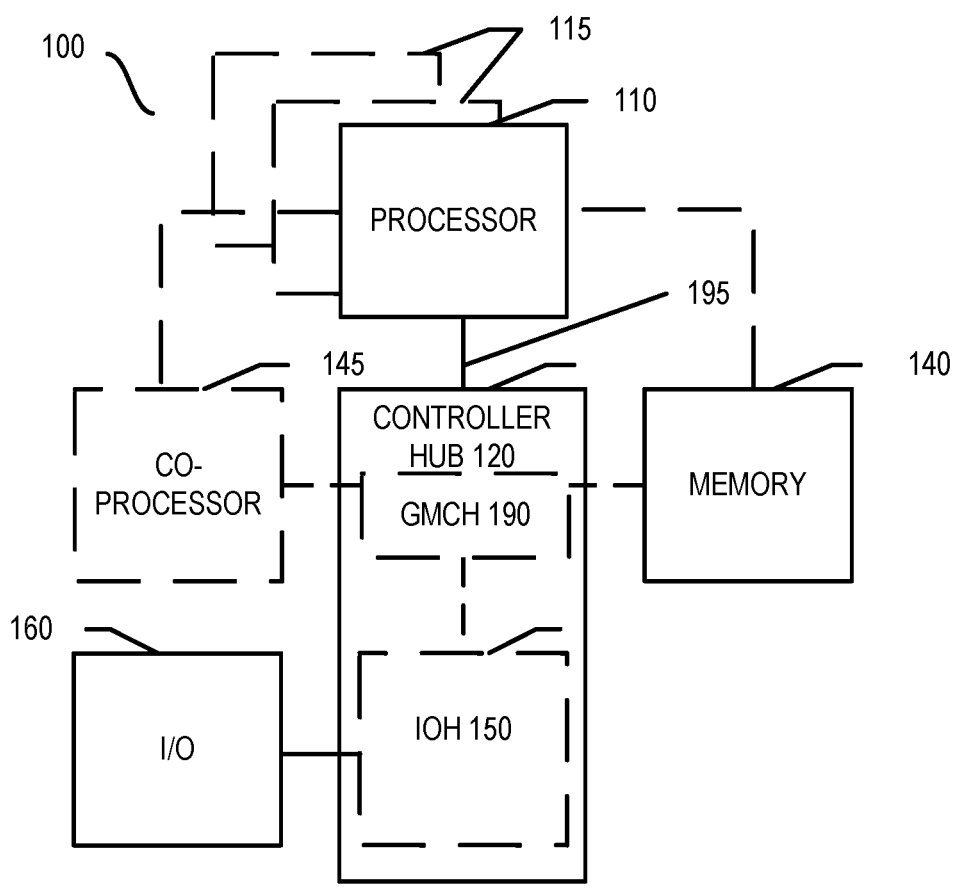
FIGS. 1-4 are block diagrams of computer architectures according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The speed at which a processor executes a program depends not only on the clock speed at which the processor executes, or in other words the number of clock cycles per second, but also on how efficiently those clock cycles are used. A processor running at a very large number of clock cycles per second may still realize suboptimal program efficiency if many of those clock cycles are wasted.

One method of increasing processor efficiency is applying phase-specific optimizations to certain program phases. The term "phase" in this context should be understood to include not only rigidly or strictly defined program phases, but also to include loosely defined portions of a program that may have different optimization requirements. For example, a first phase of a program may include interactively collecting user input, during which phase the program may be optimized for responsiveness to the user input. In a second phase, a large number of disk or memory reads may be required, in which case disk and memory throughput may be at a premium. In a third phase, the program may operate on large chunks of sequential data, in which a prefetcher may be used to ensure that the cache remains full, so that cache misses are minimized. In a fourth phase, data may be read from memory in a less predictable pattern, in which case the prefetcher may be less useful, and may in fact slow down the program. In a fifth phase, the program may perform processor intensive operations such as matrix multiplications on large data sets, in which case a premium may be placed on processor speed and on keeping the pipeline full.

In an example program, these phases may not execute in a linear sequence from one to the next. Rather, the software may "bounce" from one phase the next in a pattern that may be random or that may be predictable.

As the software executes, a software deep analysis module (DAM) may analyze the program flow to identify the various phases of the software, and to identify optimizations that may be applied to each phase. Signatures for each phase may be stored, for example, in a pattern match action (PMA) table, while optimizations for each phase may be stored in an optimization structure, such as a table or a sequence of flags that indicate which optimizations should be turned on or off for each phase.

However, a software DAM may not be responsive enough to identify a phase, learn the best optimizations for that phase, and apply those optimizations while the phase is executing. For example, the DAM may operate on the order of seconds, while the duration of each phase may be on the order of microseconds or milliseconds. Thus, a software DAM by itself may in some examples be insufficiently responsive to realize the best optimizations for a program.

Thus, embodiments of the present specification may supplement the DAM with a quick response module (QRM). The QRM may execute either directly in hardware, as hardcoded instructions, in microcode, as a field-programmable gate array (FPGA), application-specific integrated circuit (ASIC), synthesized logic, or in some cases in an accessible location such as cache. A QRM may be configured to access a PMA table as the software moves through its execution phases. The QRM may use the PMA table to identify the phases, such as by looking at stored instruction pointers, or using a branch history to match when the phase was last entered. Upon recognizing that the program is entering a particular phase, the QRM may access the optimization structure for that phase, and in real-time or near real-time, apply the optimizations for that phase. While the QRM is managing optimizations for the phase in which the program is currently executing, the DAM may be performing analysis on previously entered phases to further refine the optimizations for those phases. Thus, as the program continues executing, the DAM continues analyzing old phases to refine the optimizations for those phases, while the QRM continues to apply those optimizations to whichever phase the software is currently in.

Intel® processors provide a number of performance features that may be used in these optimizations. These include, by way of nonlimiting example, hardware prefetchers, quad-age line-replaceable unit (LRU) field policies, write/read priority in memory controllers, clock speed adjustments, and input/output prioritization. These may be used to optimize the average performance of a set of known benchmarks according to a specification. However, it may be suboptimal to apply these performance features in gross without regard to the program phase. Indeed, in some specific classes of workloads, simply applying all optimizations may actually lead to negative performance impacts.

Many emerging classes of workloads such as networking, multithreading, and large, in-memory databases may not be accounted for in baseline optimization policies. For example, for software packet processing workloads, the "mbuff" assigned for each packet may be 2 KB. (The mbuff.o module and/dev/mbuff is intended to be used as a shared memory device making memory allocated in the kernel possible to map in the user space.) For telecommunication workloads, including fifth-generation workloads, a smaller packet size may be used, such as 64 to 128 bytes. Thus, only the beginning of that 2 KB buffer may be fetched, causing large gaps among memory accesses. This can make the prefetcher ineffective. However, it may also be suboptimal to simply tune the prefetcher to fetch only 64 to 128 bytes. Rather, it is advantageous for the processor to recognize that in a first phase, such as a 5G workload, the prefetcher should fetch only 128 byte buffers, while in a second phase, it is advantageous for the prefetcher to fetch 2 KB buffers.

More generally, different workloads call for different platform configurations from each other and from the default optimization settings. Tuning of the optimizations can be used to achieve optimal performance. In a contemporary computing system, many of these optimizations may be accessed and modified, such as via the basic input/output system (BIOS), or via software-visible, model-specific registers (MSRs). However, it is also suboptimal for a human user to manually tune optimizations for specific workloads.

Human response times are orders of magnitude slower then computer operation times, and a program may switch between phases more quickly than a user can respond by tuning optimizations. Thus, the platform auto-configuration and tuning of the present specification provides optimization and tuning at processor speeds, which can be applied in real time to present workloads, and in parallel can be further fine-tuned as a program continues to operate.

In some embodiments, the QRM may monitor workloads in discrete execution intervals to collect information used to identify and characterize program phases. The DAM may perform the actual characterization and identification of the program phases. Thus, the QRM may both be informed by the DAM (for example, the QRM may use program phase definitions established by the DAM), and may also provide information to the DAM, such as reading performance monitors to identify opportunities for optimization, and for identifying phase entry points. The DAM may perform its analysis in parallel, and in some examples may be analyzing other program phases while the QRM is managing, monitoring, and optimizing a current phase. The QRM may match its currently executing phase to a previously identified phase quickly, such as by comparing with a pattern matching table. The QRM in some examples is latency sensitive, and may thus be simple enough to be implemented in hardware or in microcode, in contrast to the DAM, which may provide more complicated machine learning algorithms in software so that it can learn and adapt to previously unobserved workload behaviors by its application of sophisticated algorithms.

A system and method for platform auto-configuration and tuning will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Certain of the figures below detail example architectures and systems to implement embodiments of the above. In some embodiments, one or more hardware components and/or instructions described above are emulated as detailed below, or implemented as software modules.

FIGS. 1-4 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 1, shown is a block diagram of a system 100 in accordance with one embodiment. The system 100 may include one or more processors 110, 115, which are coupled to a controller hub 120. In one embodiment the controller hub 120 includes a graphics memory controller hub (GMCH) 190 and an Input/Output Hub (IOH) 150 (which may be on separate chips); the GMCH 190 includes memory and graphics controllers to which are coupled memory 140 and a coprocessor 145; the IOH 150 couples IO devices 160 to the GMCH 190. Alternatively, one or both of the memory and graphics controllers are integrated within the processor (as described herein), the memory 140 and the coprocessor 145 are coupled directly to the processor 110, and the controller hub 120 in a single chip with the IOH 150.

The optional nature of additional processors 115 is denoted in FIG. 1 with broken lines. Each processor 110, 115 may include one or more of the processing cores described herein.

The memory 140 may be, for example, dynamic random access memory (DRAM), phase change memory (PCM), or a combination of the two. For at least one embodiment, the controller hub 120 communicates with the processor(s) 110, 115 via a multidrop bus, such as a frontside bus (FSB), point-to-point interface such as Ultra Path Interconnect (UPI), or similar connection 195.

In one embodiment, the coprocessor 145 is a special-purpose processor, such as, for example, a high-throughput MIC processor, a network or communication processor, compression engine, graphics processor, GPGPU, embedded processor, or the like. In one embodiment, controller hub 120 may include an integrated graphics accelerator.

There can be a variety of differences between the physical resources 110, 115 in terms of a spectrum of metrics of merit including architectural, microarchitectural, thermal, power consumption characteristics, and the like.

In one embodiment, the processor 110 executes instructions that control data processing operations of a general type. Embedded within the instructions may be coprocessor instructions. The processor 110 recognizes these coprocessor instructions as being of a type that should be executed by the attached coprocessor 145. Accordingly, the processor 110 issues these coprocessor instructions (or control signals representing coprocessor instructions) on a coprocessor bus or other interconnect, to coprocessor 145. Coprocessor(s) 145 accepts and executes the received coprocessor instructions.

Figure 2:
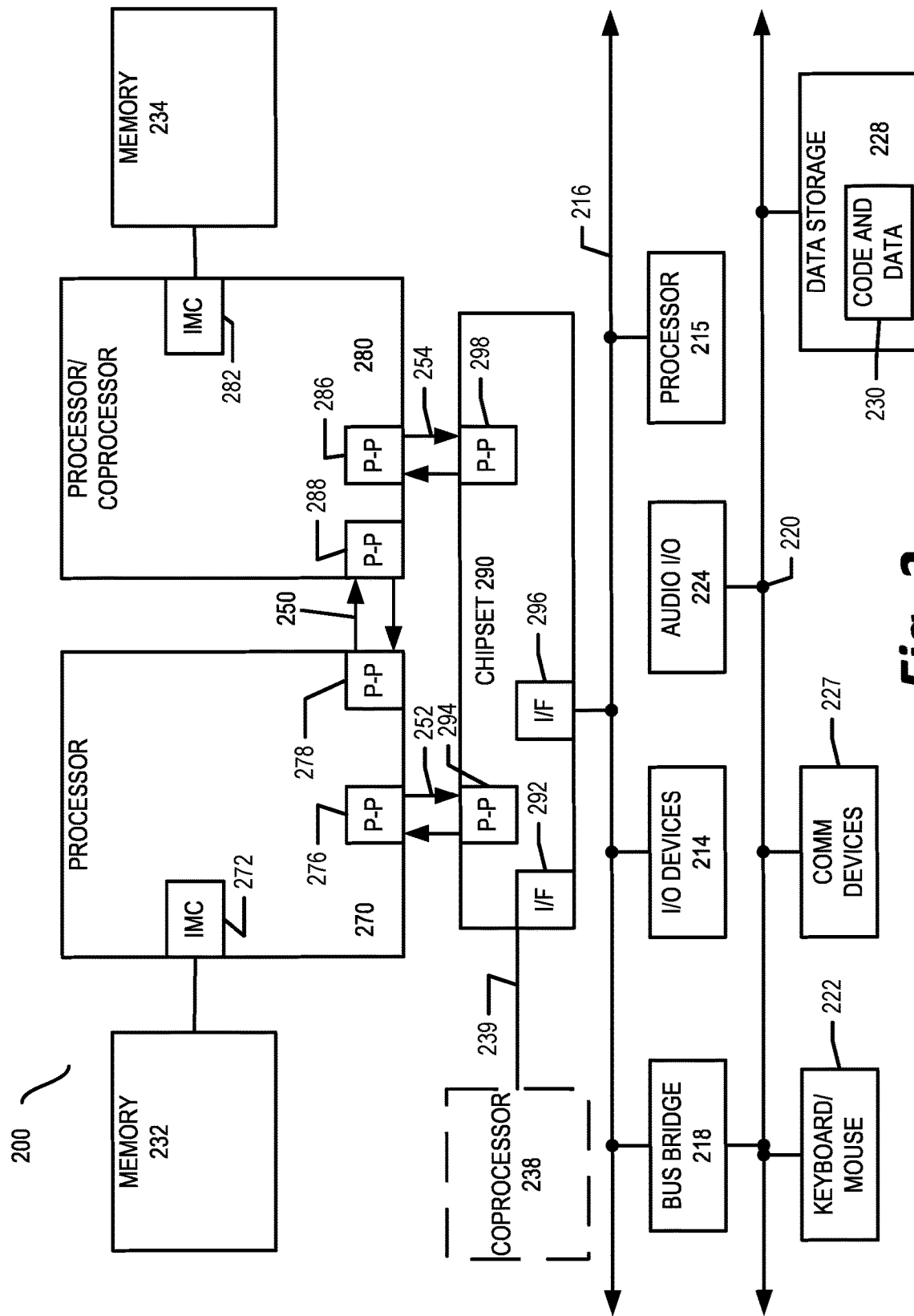

Referring now to FIG. 2, shown is a block diagram of a first more specific example system 200. As shown in FIG. 2, multiprocessor system 200 is a point-to-point interconnect system, and includes a first processor 270 and a second processor 280 coupled via a point-to-point interconnect 250. Each of processors 270 and 280 may be any suitable processor. In one embodiment, processors 270 and 280 are respectively processors 110 and 115, while coprocessor 238 is coprocessor 145. In another embodiment, processors 270 and 280 are respectively processor 110 coprocessor 145.

Processors 270 and 280 are shown including integrated memory controller (IMC) units 272 and 282, respectively. Processor 270 also includes as part of its bus controller units point-to-point (P-P) interfaces 276 and 278; similarly, second processor 280 includes P-P interfaces 286 and 288. Processors 270 and 280 may exchange information via a point-to-point (P-P) interface 250 using P-P interface circuits 278, 288. As shown in FIG. 2, IMCs 272 and 282 couple the processors to respective memories, namely a memory 232 and a memory 234, which may be portions of main memory locally attached to the respective processors.

Processors 270, 280 may each exchange information with a chipset 290 via individual P-P interfaces 252, 254 using point to point interface circuits 276, 294, 286, 298. Chipset 290 may optionally exchange information with the coprocessor 238 via a high-performance interface 239. In one embodiment, the coprocessor 238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 290 may be coupled to a first bus 216 via an interface 296. In one embodiment, first bus 216 may be a peripheral component interconnect (PCI) bus, or a bus such as a PCI Express bus or another third generation IO interconnect bus, by way of nonlimiting example.

As shown in FIG. 2, various IO devices 214 may be coupled to first bus 216, along with a bus bridge 218 which couples first bus 216 to a second bus 220. In one embodiment, one or more additional processor(s) 215, such as coprocessors, high-throughput MIC processors, GPGPUs, accelerators (such as, e.g., graphics accelerators or digital signal processing (DSP) units), field programmable gate arrays, or any other processor, are coupled to first bus 216. In one embodiment, second bus 220 may be a low pin count (LPC) bus. Various devices may be coupled to a second bus 220 including, for example, a keyboard and/or mouse 222, communication devices 227 and a storage unit 228 such as a disk drive or other mass storage device which may include instructions or code and data 230, in one embodiment. Further, an audio IO 224 may be coupled to the second bus 220. Note that other architectures are possible. For example, instead of the point-to-point architecture of FIG. 2, a system may implement a multidrop bus or other such architecture.

Figure 3:
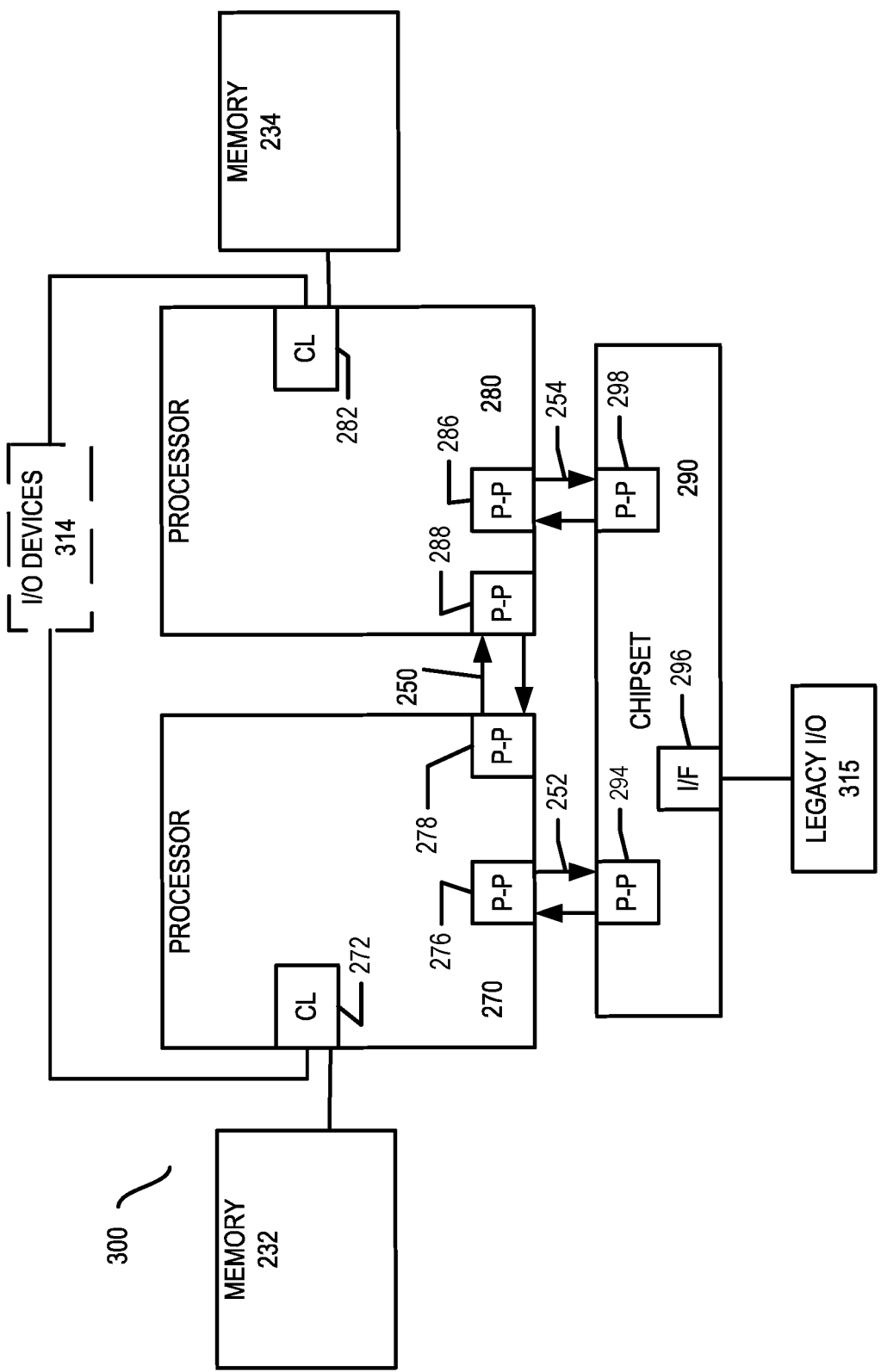

Referring now to FIG. 3, shown is a block diagram of a second more specific example system 300. FIGS. 2 and 3 bear like reference numerals, and certain aspects of FIG. 2 have been omitted from FIG. 3 in order to avoid obscuring other aspects of FIG. 3.

FIG. 3 illustrates that the processors 270, 280 may include integrated memory and IO control logic ("CL") 272 and 282, respectively. Thus, the CL 272, 282 include integrated memory controller units and include IO control logic. FIG. 3 illustrates that not only are the memories 232 and 234 coupled to the CL 272, 282, but also that IO devices 314 are also coupled to the control logic 272, 282. Legacy IO devices 315 are coupled to the chipset 290.

Figure 4:
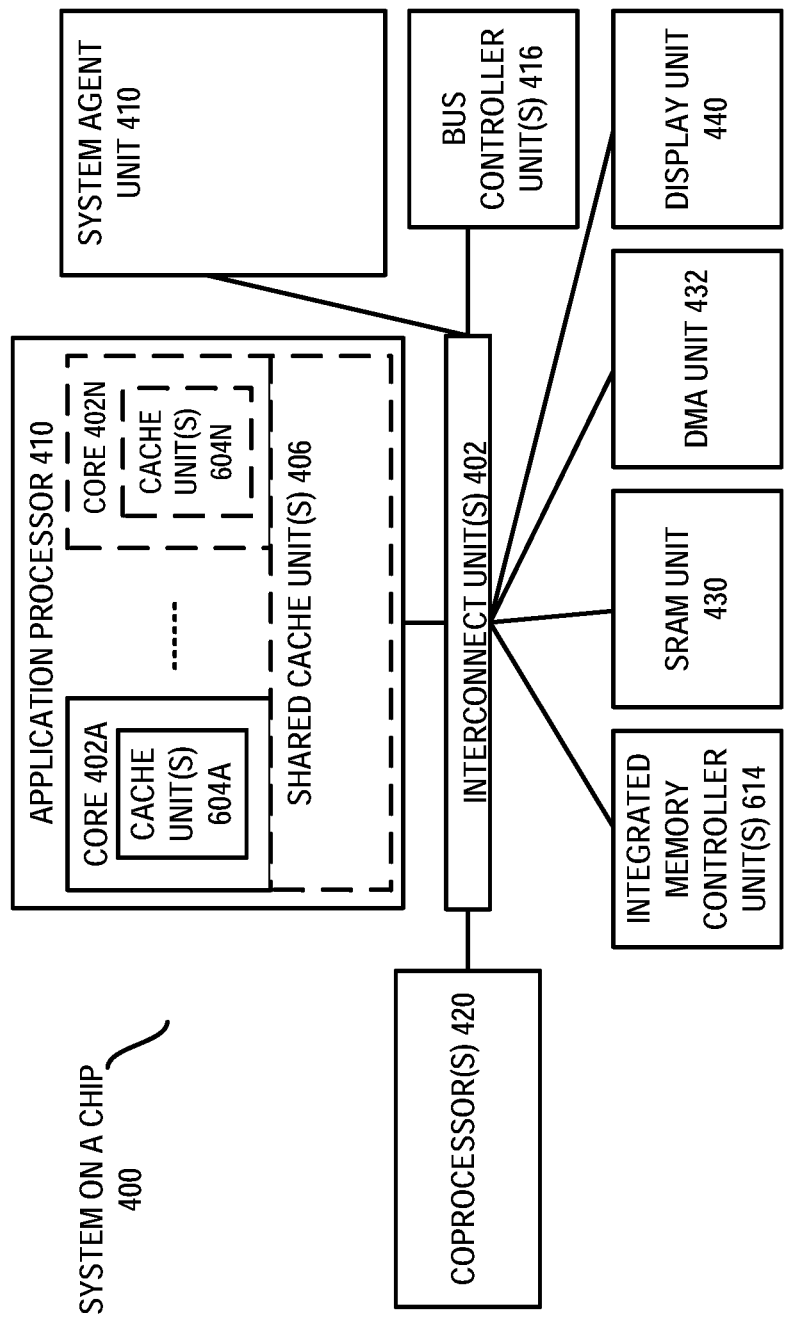

Referring now to FIG. 4, shown is a block diagram of a SoC 400 in accordance with an embodiment. Dashed lined boxes are optional features on more advanced SoCs. In FIG. 4, an interconnect unit(s) 402 is coupled to: an application processor 410 which includes a set of one or more cores 402A-N and shared cache unit(s) 406; a system agent unit 410; a bus controller unit(s) 416; an integrated memory controller unit(s) 414; a set of one or more coprocessors 420 which may include integrated graphics logic, an image processor, an audio processor, and a video processor; a static random access memory (SRAM) unit 430; a direct memory access (DMA) unit 432; and a display unit 440 for coupling to one or more external displays. In one embodiment, the coprocessor(s) 420 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 230 illustrated in FIG. 2, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, nontransitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (evictions), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include nontransitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 5:
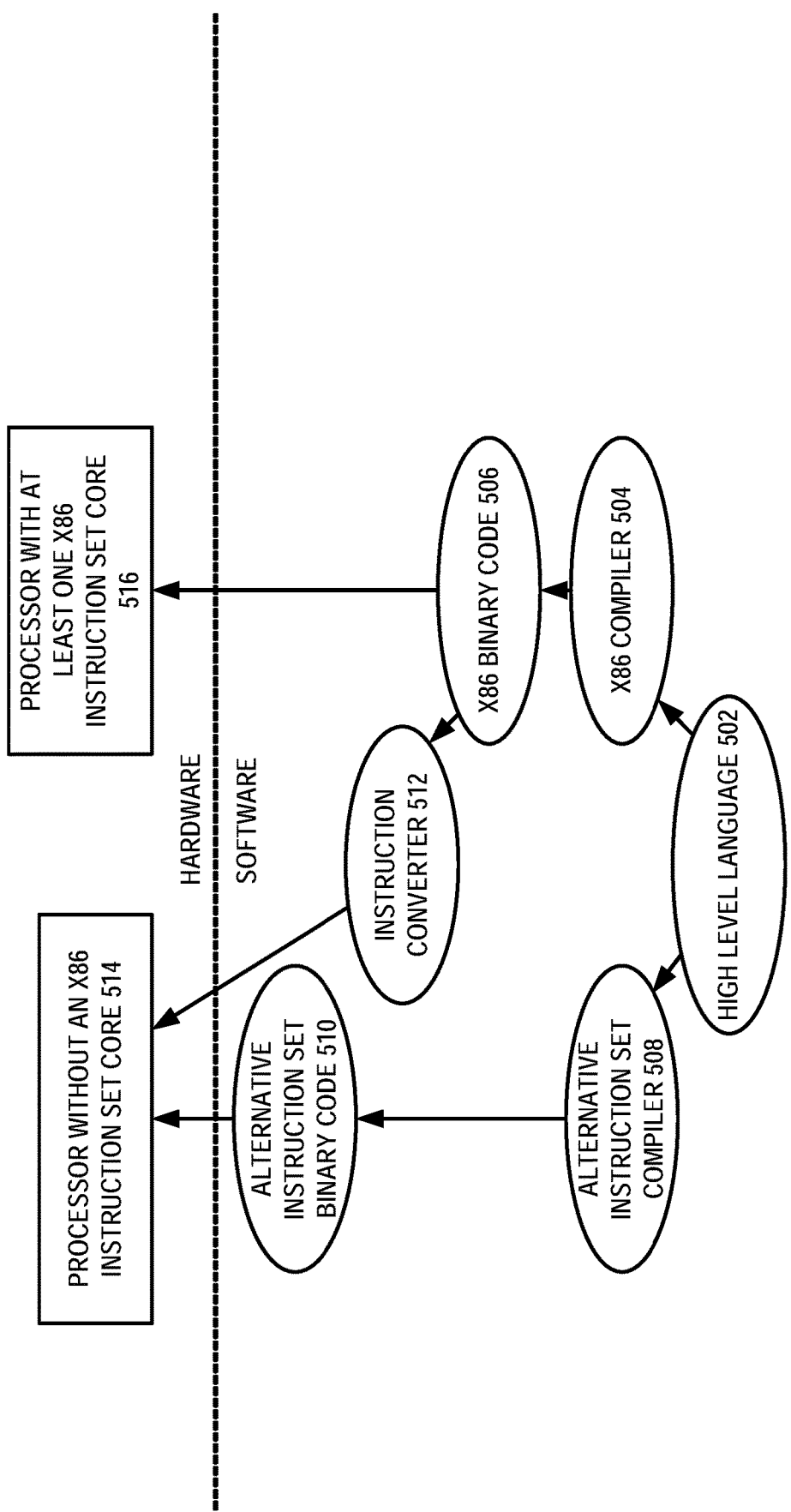
FIG. 5 is a block diagram contrasting the use of a software instruction converter to convert binary instructions in a source instruction set to binary instructions in a target instruction set according to one or more examples of the present specification.

FIG. 5 is a block diagram contrasting the use of a software instruction converter to convert binary instructions in a source instruction set to binary instructions in a target instruction set. In the illustrated embodiment, the instruction converter is a software instruction converter, although alternatively the instruction converter may be implemented in software, firmware, hardware, or various combinations thereof. FIG. 5 shows a program in a high level language 502 may be compiled using an x86 compiler 504 to generate x86 binary code 506 that may be natively executed by a processor with at least one x86 instruction set core 516. The processor with at least one x86 instruction set core 516 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 504 represents a compiler that is operable to generate x86 binary code 506 (e.g., object code) that can, with or without additional linkage processing, be executed on the processor with at least one x86 instruction set core 516. Similarly, FIG. 5 shows the program in the high level language 502 may be compiled using an alternative instruction set compiler 508 to generate alternative instruction set binary code 510 that may be natively executed by a processor without at least one x86 instruction set core 514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 512 is used to convert the x86 binary code 506 into code that may be natively executed by the processor without an x86 instruction set core 514. This converted code is not likely to be the same as the alternative instruction set binary code 510 because an instruction converter capable of this is difficult to make; however, the converted code will accomplish the general operation and be made up of instructions from the alternative instruction set. Thus, the instruction converter 512 represents software, firmware, hardware, or a combination thereof that, through emulation, simulation or any other process, allows a processor or other electronic device that does not have an x86 instruction set processor or core to execute the x86 binary code 506.

Figure 6:
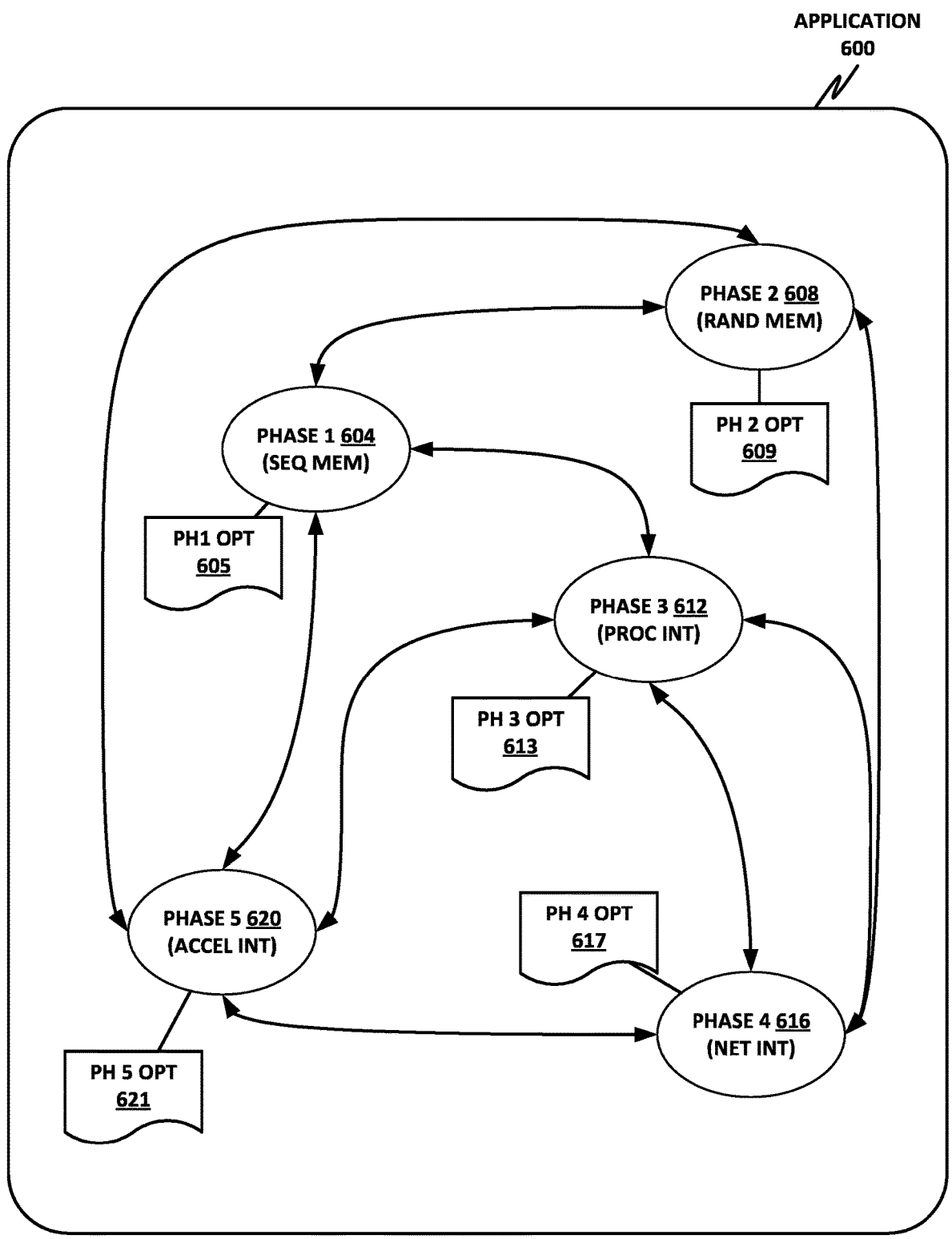
FIG. 6 is a block diagram of selected elements of an application according to one or more examples of the present specification.

FIG. 6 is a block diagram of selected elements of an application 600 according to one or more examples of the present specification.

In the example of FIG. 6, application 600 includes a number of phases. As discussed above, these phases need not be rigidly or formally defined. Rather, these phases may represent different portions of program execution that may benefit from different optimizations. In particular, the phases need not be defined in advance of optimization. Rather, a platform auto-configuration and tuning architecture as described herein, including for example a hardware QRM and a software DAM, may be used to define the phases and the appropriate optimization for each phase.

In this example, application 600 includes phase 1 604, phase 2 608, phase 3 612, phase 4 616, and phase 5 620. Each of these phases may rely more heavily on different portions of the host computing platform. For example, phase 1 604 may be a phase that performs heavy access of sequential memory. Phase 2 608 may access memory in a more random fashion. Phase 3 612 may be processor intensive. Phase 4 616 may be network intensive, while phase 5 620 may rely more extensively on hardware accelerators such as Intel® Quick Assist Technology (QAT), or other support features.

As illustrated here, program flow may not be a linear progression from one phase to the next. Rather, the program phases may have very complicated branching relationships that can make it difficult to predict in advance what phase the program will flow to next.

In this example, there are also associated with each phase certain conceptual optimizations that can improve the behavior of the phase. Phase 1 604 includes phase 1 optimizations 605. Phase 2 608 includes phase 2 optimizations 609. Phase 3 612 includes phase 3 optimizations 613. Phase 4 616 includes phase 4 optimizations 617. Phase 5 620 includes phase 5 optimizations 621.

Note that the optimizations for each phase may include any configurable parameter of the hardware platform that can benefit the phase. These can include, by way of non-limiting example, hardware prefetchers, quad-age LRU field policies, read or write priority in memory controllers, IO axis priority, clock speed tuning, memory bandwidth tuning, cache tuning, buffer sizes, or any other optimization that may be necessary.

As discussed above, the progression from one phase another phase may not be linear or necessarily predictable, and each phase may last only for a period of microseconds to milliseconds. Thus, a platform auto-configuration and tuning architecture must have the intelligence to identify the entry points of phases so that a phase can quickly be recognized when it is entered, and also have the intelligence to identify the appropriate optimizations for a phase. However, the platform auto-configuration and tuning (PACT) must also be responsive enough to apply the optimizations to a phase in real-time or near real-time when the phase is entered, and be prepared to apply new optimizations to the next phase when the next phase is entered.

Figure 7:
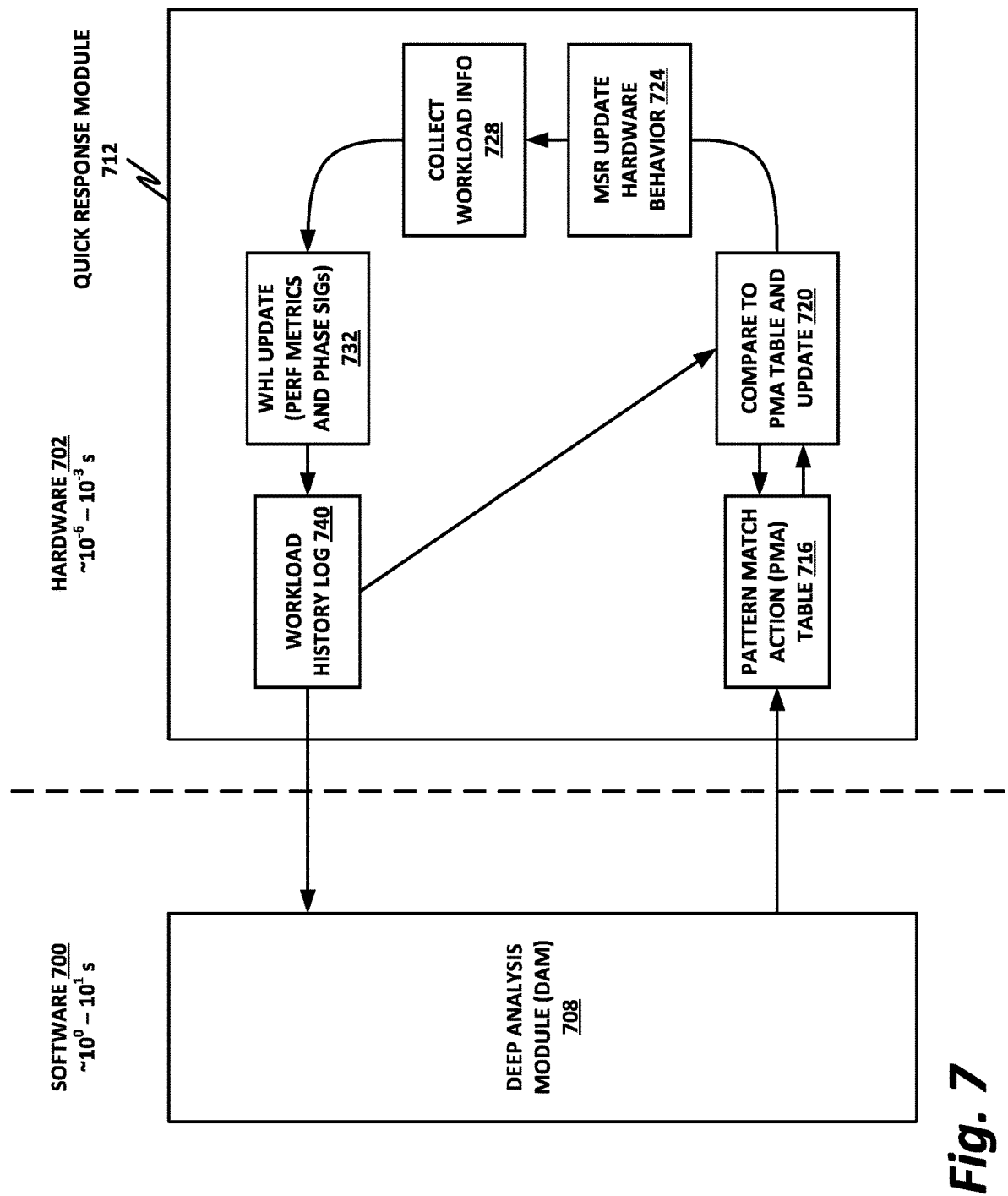
FIG. 7 is a block diagram of a platform auto-configuration and tuning (PACT) architecture according to one or more examples of the present specification.

FIG. 7 is a block diagram of a PACT architecture according to one or more examples of the present specification. In this example, software 700 and hardware 702 comprise complementary portions of the PACT. Software 700 includes deep analysis module (DAM) 708, which may provide more complex and detailed algorithms, and thus may provide a more thorough analysis. However, software 700 may operate on the order of approximately $10^0$ to $10^1$ seconds, and thus may not be responsive enough to act on program phases that last for only fractions of a second.

Hardware 702 includes quick response module 712, which may be embodied directly in hardware, in microcode, or in another fast technology such as a very fast cache. Thus, hardware 702 can operate on the order of approximately $10^{-6}$ to $10^{-3}$ seconds. This allows hardware 702 to operate on a timescale that is responsive to program phases that may operate on the order of microseconds or milliseconds. As a trade-off, QRM 712 may provide much more simplified algorithms that can be implemented directly in hardware or in microcode, and thus execute very quickly. QRM 712 and DAM 708 thus form complementary portions of the PACT. DAM 708 can perform deep analysis of phase entry points and appropriate phase optimizations, receiving performance information from QRM 712, and can thus provide very detailed optimizations for each phase. On the other hand, QRM 712 can quickly recognize phase entry points based on a phase fingerprint provided by DAM 708, can apply the appropriate optimizations specified by DAM 708, and can continue to collect performance monitoring information to allow DAM 708 to update its optimizations.

QRM 712 is configured to monitor discrete intervals of program executions utilizing information such as performance counters. QRM 712 may be designed to be lightweight, enabling it to quickly communicate newly collected information to DAM 708. QRM 712 may also determine if the current execution interval corresponds to a previously observed execution phase, and execute DAM directed configuration changes.

DAM 708 may be designed to adapt to previously unobserved workload behaviors through the application of more sophisticated algorithms such as machine learning algorithms, and thus may be much more complex than QRM 712.

To maximize efficiency, QRM 712 may have access to both core and uncore performance counters. QRM 712 may also have the ability to respond to performance counter interrupts. This allows QRM 712 to use the performance counters identify changes in workload behavior that can later be used to tune optimizations. QRM 712 may also have a low latency access to tune the performance of the platform through performance "tuning knobs," such as MSRs, BIOS settings, or other performance features that are exposed in real-time.

Because QRM 712 may be configured to collect performance data frequently, in some embodiments, it may operate without the overhead of an operating system interrupt, so that QRM 712 may benefit from either running on a specialized core on a system-on-a-chip (similar to a performance monitoring unit), or in a separate thread on a normal core. In many contexts, the use of a dedicated core to optimize software executing on the other cores may be a beneficial trade-off to realize high-performance computing applications.

In certain embodiments, QRM 712 may also be provisioned with some amount of memory to maintain a log of performance information that it has collected. These data may be stored in a small, local scratchpad memory, and periodically dumped to a dedicated portion of physical memory, which may be mapped into the operating system's view of the physical address space. This buffer in physical memory may allow QRM 712 to share logs with DAM 708, which may then use those logs to perform more detailed analysis of workload behavior, and to fine tune optimizations for each phase. While producing a log of performance information, QRM 712 may include performance counter information such as the instruction mix, translation lookaside buffer (TLB) miss rates, and/or LBR information that can be used to uniquely identify the program phase. When updating the log, QRM 712 may include metrics of performance, such as cycles per instruction (CPI), and tunable performance settings that were selected for the previous interval. This allows DAM 708 to associate performance with a particular workload phase and a configuration.

To execute configuration changes, QRM 712 may also include an internal workload model represented in a phase match action table (PMAT). This table allows matching interval information collected from QRM history logs with the appropriate execution phase and corresponding configuration updates as specified by DAM 708.

Locally, the PMA table may be cached in the scratchpad memory maintained by QRM 712, and a secondary shared copy may be maintained in memory shared by DAM 708. By updating this table with phase information and the appropriate action to take when a particular phase is detected, DAM 708 can specify the actions that QRM 712 should take when a particular interval is matched to an identified phase. Similarly, DAM 708 may schedule experimental platform changes during phases identified by its more sophisticated performance tuning algorithms. Since QRM 712 is able to query PMA table 716 quickly to take action, this allows low latency responses to changes in workload behavior despite the potentially high latency of the analysis performed by DAM 708.

In an example workflow, QRM 712 reads from a PMA table 716. This allows QRM 712 to match a previously encountered phase of a program. PMA table 716 may have been populated by DAM 708, and may include fingerprints to recognize certain program phases. In one example, PMA table 716 may be a register file or an array of registers, with each register including a fingerprint for a particular program phase. The fingerprint could include, for example, an instruction pointer value, meaning that when the program branches to that instruction pointer, it is entering the particular phase. It could also include a more sophisticated matching algorithm, such as a branching history or an LBR. Other embodiments of fingerprint pattern matching are available.

PMA table 716 may also include optimizations for each particular phase. The optimizations table may include a register or registers comprising a series of flags that indicate whether a particular optimization should be turned on or off for that phase. The optimization tables could also include other values, such as an integer field for a preferred buffer size, or any other optimization data that may be useful for optimizing a phase. As the program proceeds, in block 720, QRM 712 compares the current fingerprint to the PMA table 716 to determine whether a new phase has been entered. This may also include updating PMA table 716 with a more refined version of the phase fingerprint. Querying the PMA table 716 may include, for example, a nearest neighbor algorithm.

In block 720, QRM 712 effects the actual optimization. This could include, for example, operating MSRs to update or alter performance features. The MSRs may affect hardware behavior, changing performance metrics such as CPI, cache miss rate, or other features.

As the program phase executes, QRM 712 in block 728 collects workload information and may collect QoS metrics or other data that are useful for optimizing the program phase.

In block 732, QRM 712 may use performance counters or hardware tracing structures to collect "black box" workload information, including performance metrics and phase signatures.

In block 732, QRM 712 updates a workload history log with performance metrics and phase signatures.

This may be written to workload history log 740, which as described above, can be saved to a local scratchpad memory, and periodically flushed to main memory so that it can be shared with DAM 708.

DAM 708 may include much more varied and complicated algorithms, and may be less sensitive to the design trade-offs for implementing QRM 712 in hardware or microcode. Using the memory buffers described above, DAM 708 may attempt to collect interval information while the workload runs, and analyze it using clustering algorithms to identify representative intervals that can be grouped into execution phases.

DAM 708 may continuously update PMA table 716, which can be shared with QRM 712, and which may contain configuration changes based on the learning algorithms of DAM 708. This allows for DAM 708 to continuously monitor and react to changes in both the executing workload and the overall platform, such as by monitoring shared resource contention, IO or memory throughput, or other QoS factors.

During a relatively steady state, DAM 708 may converge to a configuration identified as being most likely to maximize performance for a given execution phase.

Figure 8:
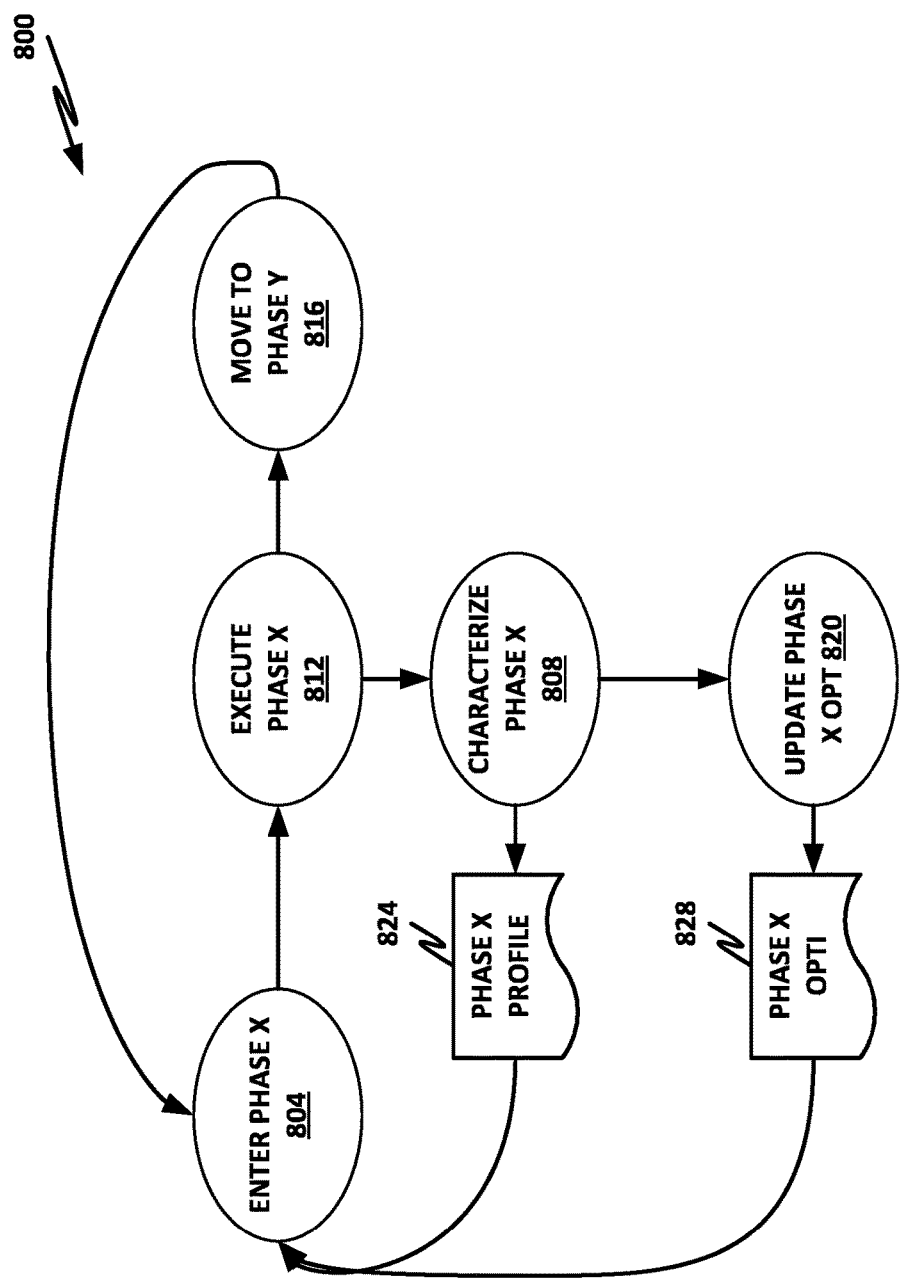
FIG. 8 is a simplified state machine diagram of phases in a PACT architecture according to one or more examples of the present specification.

FIG. 8 is a simplified state machine diagram 800 of phases in a PACT architecture according to one or more examples of the present specification.

In state 804, the program enters phase X.

After executing phase X, DAM 708 may characterize phase X in block 808, and build a phase X profile 824, including a fingerprint for phase X.

DAM 708 may also update phase X optimizations 828 in block 820.

While DAM 708 is performing this characterization and optimization, program control may move from block 812 to block 816, in which the program executes phase Y. Execution of phase Y 816 may take place in parallel with characterization of phase X in block 808, and updating a phase X optimization in 820.

The next time the program enters phase X 804, it may recognize phase X profile 824, and apply phase X optimizations 828. This time, in block 812, while phase X is executing, QRM 712 may, in real-time, continue to characterize phase X in 808 and gather information for updating phase X optimizations in 820.

When execution then moves back to phase Y 816, DAM 808 may further refine the phase X profile 824 and phase X optimizations 828. Note that although they are not shown, similar characterization and optimization of phase Y may also be performed.

From an implementation standpoint, the PACT can be thought of as an extension to the kernel. Indeed, in some embodiments, PACT may be implemented in hardware. However, changes may also be made to optimize a performance opportunity. This is because PACT employs many features within the core architecture that may not be optimized for latency, such as MSRs, and may include heavyweight computational components (such as the DAM) for online phase detection and prediction. Thus, changes to the kernel may follow the components described in FIG. 7, namely a QRM 712 for monitoring and control, and a DAM 708 as an analysis component.

The monitor and control functions of QRM 712 may include monitoring of system configurations on a per-thread basis. Each time a thread is scheduled, a number of performance counters may be monitored, and MSRs may possibly be set based on a configuration stored in a compressed format. The compression format may vary depending on the particular analysis and prediction model used. In one example, the compressed format may include a series of flags for turning on or off certain optimizations.

The compressed data may be passed to DAM 708 for consumption. In certain hardware architectures, each time the data are collected, the running process is interrupted. However, this aspect of PACT may be optimized with hardware additions that may support cross-core PMU interaction so that data collection need not interrupt running cores.

The processor control block for each thread may be augmented with fields to store system configuration states such as preferred prefetcher configurations and cache replacement algorithms. When QRM 712 is loaded, these configurations can be applied to the running CPU or core. Many of these configurations affect both SMT threads, or in some cases the entire uncore. If PACT is to be implemented in an SMT environment, the operating system may be configured to consider the performance impact of both configurations associated with the threads scheduled on the same physical core.

DAM 708 may be built into a specific thread, or may be run on a dedicated core. Unlike other kernel threads which may only be scheduled periodically, DAM 708 may require significant computation for its phase detection, prediction, and optimization algorithms. Thus, in certain embodiments, DAM 708 may be configured as a process that runs continuously. In some embodiments, this may be configured to consume an entire core. However, the benefit is realized as the count of compute cores, particularly in highly intense computing applications, continues to increase. Furthermore, the DAM thread need not consume the entire core. In some embodiments, a design may specifically include a sequestered core dedicated solely to DAM 708. This core may not only perform necessary computations required by DAM 708, but may also subsume governor features such as C-state and P-state control.

Prototyping of a PACT of the present specification has been performed. Experimentally, the studies were completed on a number of Spec2006 benchmarks as well as micro-benchmarks to aid in understanding how dynamic hardware mechanisms respond. To compute these potentials, workloads were run multiple times on highly controlled, real silicon in different configurations. In certain experiments, particular phases of execution preferred custom system configurations. For the workloads tested, up to 25% instructions per cycle were observed by altering prefetcher configurations, and up to 20% improvement was observed by altering cache replacement algorithms during specific program phases for workloads in the Spec2006 suite. Experimentally, microbenchmarks suggest even greater performance potential, especially in those with high core-to-core communication. False data sharing caused by prefetchers was found to degrade performance by up to 88%. However, the experimental PACT was able to learn these phases and their preferred system configuration, thus eliminating these outlier cases with negative performance impacts.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

As used throughout this specification, the term "processor" or "microprocessor" should be understood to include not only a traditional microprocessor (such as industry-leading x86 and x64 architectures by Intel®), but also any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field-programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations. A nontransitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. section 112, as it exists on the date of the filing hereof, unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing platform, comprising: an execution unit to execute a program, the program comprising a first phase and a second phase; and a quick response module (QRM) to: receive a program phase signature for the first phase; store the program phase signature in a pattern match action (PMA) table; identify entry of the program into the first phase via the PMA; and apply an optimization to the computing platform.

Example 2 includes the computing platform of example 1, wherein the QRM is further to: receive an optimization structure for the first phase; and store the optimization structure for the first phase, wherein applying the optimization comprises reading the optimization structure for the first phase.

Example 3 includes the computing platform of example 2, wherein the optimization structure for the first phase comprises a register having flags for turning features on or off.

Example 4 includes the computing platform of any of examples 1-3, wherein the QRM is embodied at least partly in microcode.

Example 5 includes the computing platform of any of examples 1-3, wherein the QRM is embodied at least partly in hardware.

Example 6 includes the computing platform of any of examples 1-3, wherein the PMA table comprises an array of registers.

Example 7 includes the computing platform of example 6, wherein the array of registers includes one register to hold a signature for each of the first phase and the second phase.

Example 8 includes the computing platform of example 7, wherein the signature comprises a program counter.

Example 9 includes the computing platform of any of examples 1-3, wherein the PMA table is configured to be stored in cache.

Example 10 includes the computing platform of any of examples 1-3, wherein the PMA table is configured to be stored in memory.

Example 11 includes the computing platform of any of examples 1-3, wherein identifying entry to the first phase comprises determining branch history from a last branch record.

Example 12 includes the computing platform of any of examples 1-3, wherein identifying entry to the first phase comprises determining branch history from a processor trace.

Example 13 includes a computing system, comprising: a processor, comprising: an execution unit to execute a program, the program comprising a first phase and a second phase; and a quick response module (QRM) to: receive a program phase signature for the first phase; store the program phase signature in a pattern match action (PMA) table; identify entry of the program into the first phase via the PMA; and apply an optimization to the computing system.

Example 14 includes the computing system of example 13, wherein the QRM is further to: receive an optimization structure for the first phase; and store the optimization structure for the first phase, wherein applying the optimization comprises reading the optimization structure for the first phase.

Example 15 includes the computing system of example 14, wherein the optimization structure comprises a register having flags for turning features on or off.

Example 16 includes the computing system of example 14, further comprising a software deep analysis module (DAM) configured to update the optimization structure.

Example 17 includes the computing system of example 16, wherein the DAM is configured to update the optimization structure according to a machine learning algorithm.

Example 18 includes the computing system of example 17, wherein the DAM is configured to update the optimization structure for the first phase while the QRM applies an optimization to the second phase.

Example 19 includes the computing system of any of examples 13-18, wherein the QRM is embodied at least partly in microcode.

Example 20 includes the computing system of any of examples 13-18, wherein the QRM is embodied at least partly in hardware.

Example 21 includes the computing system of examples 13-18, wherein the PMA table comprises an array of registers.

Example 22 includes the computing system of example 21, wherein the array of registers includes one register to hold a signature for each of the first phase and the second phase.

Example 23 includes the computing system of example 22, wherein the signature comprises a program counter.

Example 24 includes the computing system of any of examples 13-18, wherein the PMA table is configured to be stored in cache.

Example 25 includes the computing system of any of examples 13-18, wherein the PMA table is configured to be stored in memory.

Example 26 includes the computing system of any of examples 13-18, wherein identifying entry to the first phase comprises determining branch history from a last branch record.

Example 27 includes the computing system of any of examples 13-18, wherein identifying entry to the first phase comprises determining branch history from a processor trace.

Example 28 includes a computer-implemented method of performing two-stage optimization for a program comprising a first phase and a second phase, comprising: receiving a program phase signature for the first phase; storing the program phase signature in a pattern match action (PMA) table; identifying entry of the program into the first phase via the PMA; and applying an optimization to the first phase of the program.

Example 29 includes the method of example 28, further comprising: receiving an optimization structure for the first phase; and restoring the optimization structure for the first phase, wherein applying the optimization comprises reading the optimization structure for the first phase.

Example 30 includes the method of example 29, wherein the optimization structure comprises a register having flags for turning features on or off.

Example 31 includes the method of example 30, further comprising performing deep analysis to update the optimization structure.

Example 32 includes the method of example 31, wherein updating the optimization structure comprises applying a machine learning algorithm.

Example 33 includes the method of example 32, further comprising updating the optimization structure for the first phase while applying an optimization to the second phase.

Example 34 includes the method of any of examples 28-33, wherein the PMA table comprises an array of registers.

Example 35 includes the method of example 34, wherein the array of registers includes one register to hold a signature for each of the first phase and the second phase.

Example 36 includes the method of example 35, wherein the signature comprises a program counter.

Example 37 includes the method of any of examples 28-33, wherein the PMA table is configured to be stored in cache.

Example 38 includes the method of any of examples 28-33, wherein the PMA table is configured to be stored in memory.

Example 39 includes the method of any of examples 28-33, wherein identifying entry to the first phase comprises determining branch history from a last branch record.

Example 40 includes the method of any of examples 28-33, wherein identifying entry to the first phase comprises determining branch history from a processor trace.

Example 41 includes an apparatus comprising means for performing the method of any of examples 28-40.

Example 42 includes the apparatus of example 41, wherein the means comprise a hardware quick response module (QRM).

Example 43 includes the apparatus of example 41, wherein the means comprise a microcode quick response module (QRM).

Example 44 includes the apparatus of example 41, wherein the means comprise a software deep analysis module (DAM).

What is claimed is:

1. A computing platform, comprising:
   an execution unit to execute a program, the program comprising a first phase and a second phase; and
   a hardware module to:
     receive a program phase signature for the first phase;
     store the program phase signature in a pattern match action (PMA) table;
     identify entry of the program into the first phase via the PMA table; and
     apply an optimization to the computing platform.

2. The computing platform of claim 1, wherein the hardware module is further to:
   receive an optimization structure for the first phase; and
   store the optimization structure for the first phase,
   wherein applying the optimization comprises reading the optimization structure for the first phase.

3. The computing platform of claim 2, wherein the optimization structure for the first phase comprises a register having flags for turning features on or off.

4. The computing platform of claim 1, wherein the hardware module is embodied at least partly in microcode.

5. The computing platform of claim 1, wherein the hardware module is embodied at least partly in hardware.

6. The computing platform of claim 1, wherein the PMA table comprises an array of registers.

7. The computing platform of claim 6, wherein the array of registers includes one register to hold a signature for each of the first phase and the second phase.

8. The computing platform of claim 7, wherein the signature comprises a program counter.

9. The computing platform of claim 1, wherein the PMA table is configured to be stored in cache.

10. The computing platform of claim 1, wherein the PMA table is configured to be stored in memory.

11. The computing platform of claim 1, wherein identifying entry to the first phase comprises determining branch history from a last branch record.

12. The computing platform of claim 1, wherein identifying entry to the first phase comprises determining branch history from a processor trace.

13. A computing system, comprising:
   a processor, comprising:
     an execution unit to execute a program, the program comprising a first phase and a second phase; and
     a circuit to:
       receive a program phase signature for the first phase;
       store the program phase signature in a pattern match action (PMA) table;

identify entry of the program into the first phase via the PMA table; and apply an optimization to the computing system.

14. The computing system of claim 13, wherein the circuit is further to:

receive an optimization structure for the first phase; and store the optimization structure for the first phase, wherein applying the optimization comprises reading the optimization structure for the first phase.

15. The computing system of claim 14, wherein the optimization structure comprises a register having flags for turning features on or off.

16. The computing system of claim 14, further comprising a software deep analysis module (DAM) configured to update the optimization structure.

17. The computing system of claim 16, wherein the DAM is configured to update the optimization structure according to a machine learning algorithm.

18. The computing system of claim 17, wherein the DAM is configured to update the optimization structure for the first phase while the circuit applies an optimization to the second phase.

19. The computing system of claim 13, wherein the circuit is embodied at least partly in microcode.

20. The computing system of claim 13, wherein the circuit is embodied at least partly in hardware.

21. The computing system of claim 13, wherein the PMA table comprises an array of registers.

22. The computing system of claim 21, wherein the array of registers includes one register to hold a signature for each of the first phase and the second phase.

23. The computing system of claim 22, wherein the signature comprises a program counter.

24. A computer-implemented method of performing two-stage optimization for a program comprising a first phase and a second phase, comprising:

receiving, within a hardware module, a program phase signature for the first phase;

storing the program phase signature in a pattern match action (PMA) table;

identifying entry of the program into the first phase via the PMA table; and applying an optimization to the first phase of the program.

25. The method of claim 24, further comprising:

receiving an optimization structure for the first phase; and storing the optimization structure for the first phase, wherein applying the optimization comprises reading the optimization structure for the first phase.

* * * * *

UNITED STATES PATENT AND TRADEMARK OFFICE
CERTIFICATE OF CORRECTION

PATENT NO. : 11,042,403 B2  
APPLICATION NO. : 15/645226  
DATED : June 22, 2021  
INVENTOR(S) : Wilkerson et al.

It is certified that error appears in the above-identified patent and that said Letters Patent is hereby corrected as shown below:

On the Title Page

Column 2, in the Item (56), under "OTHER PUBLICATIONS", Line 1, delete "Hsu etal.," and insert -- Hsu et al., --, therefor.

Column 2, in the Item (56), under "OTHER PUBLICATIONS", Line 5, delete "Vijayan ,B.," and insert -- Vijayan, B., --, therefor.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*